US010040991B2

(12) United States Patent
Kakadjian et al.

(10) Patent No.: US 10,040,991 B2
(45) Date of Patent: Aug. 7, 2018

(54) ZETA POTENTIAL MODIFIERS TO DECREASE THE RESIDUAL OIL SATURATION

(71) Applicant: The Lubrizol Corporation, Wickliffe, OH (US)

(72) Inventors: Sarkis R. Kakadjian, Houston, TX (US); Frank Zamora, Ft. Worth, TX (US); Raynard Veldman, Houston, TX (US); Ronald van Petegen, Houston, TX (US)

(73) Assignee: The Lubrizol Corporation, Wickliffe, OH (US)

( * ) Notice: Subject to any disclaimer, the term of this patent is extended or adjusted under 35 U.S.C. 154(b) by 21 days.

(21) Appl. No.: 14/308,160

(22) Filed: Jun. 18, 2014

(65) Prior Publication Data
US 2014/0303048 A1 Oct. 9, 2014

Related U.S. Application Data

(60) Division of application No. 12/832,222, filed on Jul. 8, 2010, now Pat. No. 8,871,694, which is a
(Continued)

(51) Int. Cl.
C09K 8/64 (2006.01)
C09K 8/60 (2006.01)
(Continued)

(52) U.S. Cl.
CPC ............. C09K 8/86 (2013.01); C09K 8/035 (2013.01); C09K 8/506 (2013.01); C09K 8/584 (2013.01);
(Continued)

(58) Field of Classification Search
CPC . C09K 8/54; C09K 8/58; C09K 8/528; C09K 8/80; C09K 2208/32; Y10S 507/935; Y10S 507/939
(Continued)

(56) References Cited

U.S. PATENT DOCUMENTS 2,196,042 A 4/1940 Timpson ........................ 23/11
2,262,428 A 11/1941 Lietz ............................ 507/242
(Continued)

FOREIGN PATENT DOCUMENTS

CA 2125513 1/1995
CA 2437522 A1 2/2005
(Continued)

OTHER PUBLICATIONS

Abdel-Moghny et al, "Inhibition of Scales Deposited in Oil Well," Materials Science Research India, 1, 35-44 (s003).
Extended Search Report.

Primary Examiner — Aiqun Li
(74) Attorney, Agent, or Firm — Christopher P. Demas; Teresan W. Gilbert

(57) ABSTRACT

Compositions comprise an amine component, an amine/phosphate component and may also include a solvent component. The compositions are adapted to coat solid materials, substrates and/or surfaces of producing reservoirs and formations and methods for making and using same, where the coating agents modify surface properties of the solid materials, substrates and/or surfaces of producing formations decreasing residual oil saturation.

18 Claims, 1 Drawing Sheet

Related U.S. Application Data continuation-in-part of application No. 12/151,429, filed on May 6, 2008, now Pat. No. 7,956,017, and a continuation-in-part of application No. 12/075,461, filed on Mar. 11, 2008, now Pat. No. 7,829,510.

(51) Int. Cl.

| | | |
|---|---|---|
| *E21B 47/00* | (2012.01) | |
| *E21B 43/00* | (2006.01) | |
| *C09K 8/86* | (2006.01) | |
| *C09K 8/035* | (2006.01) | |
| *C09K 8/506* | (2006.01) | |
| *C09K 8/584* | (2006.01) | |
| *C09K 8/68* | (2006.01) | |
| *C09K 8/80* | (2006.01) | |

(52) U.S. Cl.
CPC ............... *C09K 8/602* (2013.01); *C09K 8/68* (2013.01); *C09K 8/805* (2013.01)

(58) Field of Classification Search
USPC ........................................ 507/238; 166/252.2
See application file for complete search history.

(56) References Cited

U.S. PATENT DOCUMENTS

| | | | | |
|---|---|---|---|---|
| 2,390,153 | A | 12/1945 | Kern | 260/72 |
| 2,805,958 | A | 7/1959 | Bueche et al. | 106/308 |
| 3,059,909 | A | 10/1962 | Wise | 261/39.3 |
| 3,163,219 | A | 12/1964 | Wyant et al. | 166/283 |
| 3,301,723 | A | 1/1967 | Chrisp | 149/20 |
| 3,301,848 | A | 1/1967 | Halleck | 536/123.1 |
| 3,303,896 | A | 2/1967 | Tillotson et al. | 175/69 |
| 3,317,430 | A | 5/1967 | Priestley et al. | 510/503 |
| 3,335,794 | A | 8/1967 | Bond | 166/271 |
| 3,414,054 | A | 12/1968 | Bernard | 166/270.1 |
| 3,477,956 | A | 11/1969 | Stanford et al. | |
| 3,565,176 | A | 2/1971 | Wittenwyler | 166/270 |
| 3,584,687 | A | 6/1971 | Stanford et al. | 166/279 |
| 3,856,921 | A | 12/1974 | Shrier et al. | 423/228 |
| 3,888,312 | A | 6/1975 | Tiner et al. | 166/308.5 |
| 3,933,205 | A | 1/1976 | Kiel | 166/308.1 |
| 3,937,283 | A | 2/1976 | Blauer et al. | 166/307 |
| 3,960,736 | A | 6/1976 | Free et al. | 507/216 |
| 3,965,982 | A | 6/1976 | Medlin | 166/249 |
| 3,990,978 | A | 11/1976 | Hill | 507/235 |
| 4,007,792 | A | 2/1977 | Meister | 166/308.2 |
| 4,052,159 | A | 10/1977 | Fuerst et al. | |
| 4,066,398 | A | 1/1978 | Hwa | |
| 4,067,389 | A | 1/1978 | Savins | 166/246 |
| 4,101,441 | A | 7/1978 | Hwa et al. | 252/389.2 |
| 4,108,782 | A | 8/1978 | Thompon | 507/205 |
| 4,112,050 | A | 9/1978 | Sartori et al. | 423/223 |
| 4,112,051 | A | 9/1978 | Sartori et al. | 423/223 |
| 4,112,052 | A | 9/1978 | Sartori et al. | 423/223 |
| 4,113,631 | A | 9/1978 | Thompson | 507/202 |
| 4,123,234 | A | 10/1978 | Vossos | |
| 4,378,845 | A | 4/1983 | Medlin et al. | 166/297 |
| 4,385,935 | A | 5/1983 | Skjeldal | 106/607 |
| 4,444,262 | A | 4/1984 | Haskin et al. | 166/270.2 |
| 4,461,716 | A | 7/1984 | Barbarin et al. | 252/307 |
| 4,479,041 | A | 10/1984 | Fenwick et al. | 200/81 R |
| 4,506,734 | A | 3/1985 | Nolte | 166/308.1 |
| 4,514,309 | A | 4/1985 | Wadhwa | 507/211 |
| 4,541,935 | A | 9/1985 | Constien et al. | 507/225 |
| 4,549,608 | A | 10/1985 | Stowe et al. | 166/280.1 |
| 4,554,090 | A | 11/1985 | Jones | 252/181 |
| 4,561,985 | A | 12/1985 | Glass, Jr. | 507/108 |
| 4,623,021 | A | 11/1986 | Stowe | 166/250.1 |
| 4,654,266 | A | 3/1987 | Kachnik | 428/403 |
| 4,657,081 | A | 4/1987 | Hodge | 166/380.5 |
| 4,660,643 | A | 4/1987 | Perkins | 166/283 |
| 4,683,068 | A | 7/1987 | Kucera | 507/201 |
| 4,686,052 | A | 8/1987 | Baranet et al. | 507/244 |
| 4,695,389 | A | 9/1987 | Kubala | 507/244 |
| 4,705,113 | A | 11/1987 | Perkins | 166/302 |
| 4,714,115 | A | 12/1987 | Uhri | 166/308.1 |
| 4,718,490 | A | 1/1988 | Uhri | 166/281 |
| 4,724,905 | A | 2/1988 | Uhri | 166/250.1 |
| 4,725,372 | A | 2/1988 | Teot et al. | 507/129 |
| 4,739,834 | A | 4/1988 | Peiffer et al. | 166/308.4 |
| 4,741,401 | A | 5/1988 | Wailes et al. | 166/300 |
| 4,748,011 | A | 5/1988 | Baize | 423/228 |
| 4,779,680 | A | 10/1988 | Sydansk | 166/300 |
| 4,795,574 | A | 1/1989 | Syrinek et al. | 507/238 |
| 4,817,717 | A | 4/1989 | Jennings, Jr. et al. | 166/278 |
| 4,830,106 | A | 5/1989 | Uhri | 166/250.1 |
| 4,846,277 | A | 7/1989 | Khalil et al. | 166/280.1 |
| 4,848,468 | A | 7/1989 | Hazlett et al. | 166/300 |
| 4,852,650 | A | 8/1989 | Jennings, Jr. et al. | 166/250.1 |
| 4,869,322 | A | 9/1989 | Vogt, Jr. et al. | 166/280.1 |
| 4,892,147 | A | 1/1990 | Jennings, Jr. et al. | 166/280.2 |
| 4,926,940 | A | 5/1990 | Stromswold | 166/247 |
| 4,938,286 | A | 7/1990 | Jennings, Jr. | 166/280.1 |
| 4,978,512 | A | 12/1990 | Dillon | 423/226 |
| 5,005,645 | A | 4/1991 | Jennings, Jr. et al. | 166/280.1 |
| 5,024,276 | A | 6/1991 | Borchardt | 166/308.6 |
| 5,067,556 | A | 11/1991 | Fudono et al. | 62/196.4 |
| 5,074,359 | A | 12/1991 | Schmidt | 166/280.1 |
| 5,074,991 | A | 12/1991 | Weers | 208/236 |
| 5,082,579 | A | 1/1992 | Dawson | 507/211 |
| 5,106,518 | A | 4/1992 | Cooney et al. | 507/21 |
| 5,110,486 | A | 5/1992 | Manalastas et al. | 507/260 |
| 5,169,411 | A | 12/1992 | Weers | 44/421 |
| 5,224,546 | A | 7/1993 | Smith et al. | 166/300 |
| 5,228,510 | A | 7/1993 | Jennings, Jr. et al. | 166/263 |
| 5,246,073 | A | 9/1993 | Sandiford et al. | 166/295 |
| 5,259,455 | A | 11/1993 | Nimerick et al. | 166/308.5 |
| 5,330,005 | A | 7/1994 | Card et al. | 166/280.2 |
| 5,342,530 | A | 8/1994 | Aften et al. | 252/8.551 |
| 5,347,004 | A | 9/1994 | Rivers et al. | 544/180 |
| 5,363,919 | A | 11/1994 | Jennings, Jr. | 166/308.1 |
| 5,465,792 | A | 1/1995 | Dawson et al. | 166/295 |
| 5,402,846 | A | 4/1995 | Jennings, Jr. et al. | 166/259 |
| 5,411,091 | A | 5/1995 | Jennings, Jr. | 166/280.1 |
| 5,424,284 | A | 6/1995 | Patel et al. | 507/129 |
| 5,439,055 | A | 8/1995 | Card et al. | 166/280.2 |
| 5,462,721 | A | 10/1995 | Pounds et al. | 423/226 |
| 5,472,049 | A | 12/1995 | Chaffe et al. | 166/250.1 |
| 5,482,116 | A | 1/1996 | El-Rabaa et al. | 166/250.1 |
| 5,488,083 | A | 1/1996 | Kinsey, III et al. | 507/211 |
| 5,497,831 | A | 3/1996 | Hainey et al. | 166/308.1 |
| 5,501,275 | A | 3/1996 | Card et al. | 166/280.2 |
| 5,539,044 | A | 7/1996 | Dindi et al. | 524/570 |
| 5,551,516 | A | 9/1996 | Norman et al. | 166/308.2 |
| 5,624,886 | A | 4/1997 | Dawson et al. | 507/217 |
| 5,635,458 | A | 6/1997 | Lee et al. | 507/240 |
| 5,649,596 | A | 7/1997 | Jones et al. | 166/300 |
| 5,669,447 | A | 9/1997 | Walker et al. | 166/300 |
| 5,674,377 | A | 10/1997 | Sullivan, III et al. | 208/208 R |
| 5,688,478 | A | 11/1997 | Pounds et al. | 423/228 |
| 5,693,837 | A | 12/1997 | Smith et al. | 556/148 |
| 5,711,396 | A | 1/1998 | Joerg et al. | 180/444 |
| 5,722,490 | A | 3/1998 | Ebinger | 166/281 |
| 5,744,024 | A | 4/1998 | Sullivan, III et al. | 208/236 |
| 5,755,286 | A | 5/1998 | Ebinger | 166/281 |
| 5,775,425 | A | 7/1998 | Weaver et al. | 166/276 |
| 5,787,986 | A | 8/1998 | Weaver et al. | 166/280.2 |
| 5,806,597 | A | 9/1998 | Tjon-Joe-Pin et al. | 166/300 |
| 5,807,812 | A | 9/1998 | Smith et al. | 507/238 |
| 5,833,000 | A | 11/1998 | Weaver et al. | 166/276 |
| 5,853,048 | A | 12/1998 | Weaver et al. | 166/279 |
| 5,871,049 | A | 2/1999 | Weaver et al. | 166/276 |
| 5,877,127 | A | 3/1999 | Card et al. | 507/273 |
| 5,908,073 | A | 6/1999 | Nguyen et al. | 166/276 |
| 5,908,814 | A | 6/1999 | Patel et al. | 507/131 |
| 5,964,295 | A | 10/1999 | Brown et al. | 166/308.2 |
| 5,979,557 | A | 11/1999 | Card et al. | 166/300 |
| 5,980,845 | A | 11/1999 | Cherry | 423/229 |
| 6,001,887 | A | 12/1999 | Keup et al. | 516/118 |
| 6,016,871 | A | 1/2000 | Burts, Jr. | 166/300 |
| 6,035,936 | A | 3/2000 | Whalen | 166/308.5 |

(56) References Cited

U.S. PATENT DOCUMENTS

| | | | |
|---|---|---|---|
| 6,040,360 A * | 3/2000 | Menovcik | C09C 1/3676 523/200 |
| 6,047,772 A | 4/2000 | Weaver et al. | 166/276 |
| 6,054,417 A | 4/2000 | Graham et al. | 507/238 |
| 6,059,034 A | 5/2000 | Rickards et al. | 166/280.2 |
| 6,060,436 A | 5/2000 | Synder et al. | 507/266 |
| 6,063,972 A | 5/2000 | Duncum et al. | 585/15 |
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,228,812 B1 | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel | 166/279 |
| 6,291,405 B1 | 9/2001 | Lee et al. | 507/136 |
| 6,330,916 B1 | 12/2001 | Rickards et al. | 166/280.2 |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |
| 7,268,100 B2 | 9/2007 | Kippie et al. | 507/244 |
| 7,350,579 B2 | 4/2008 | Gatlin et al. | 166/308.3 |
| 7,392,847 B2 | 7/2008 | Gatlin et al. | 166/280.2 |
| 7,517,447 B2 | 4/2009 | Gatlin | 208/236 |
| 7,565,933 B2 | 7/2009 | Kippie et al. | |
| 7,566,686 B2 | 7/2009 | Kippie et al. | 507/213 |
| 7,712,535 B2 | 5/2010 | Venditto et al. | |
| 7,767,628 B2 | 8/2010 | Kippie et al. | 507/102 |
| 7,829,510 B2 | 11/2010 | Gatlin et al. | |
| 7,886,824 B2 | 2/2011 | Kakadjian et al. | |
| 7,915,203 B2 | 3/2011 | Falana et al. | |
| 7,932,214 B2 | 4/2011 | Zamora et al. | |
| 7,942,201 B2 | 5/2011 | Ekstrand et al. | |
| 7,956,017 B2 | 6/2011 | Gatlin et al. | |
| 7,956,217 B2 | 6/2011 | Falana et al. | |
| 7,971,659 B2 | 7/2011 | Gatlin et al. | 510/492 |
| 7,989,404 B2 | 8/2011 | Kakadjian et al. | |
| 7,992,653 B2 | 8/2011 | Zamora et al. | |
| 8,011,431 B2 | 9/2011 | van Petegem et al. | |
| 8,028,755 B2 | 10/2011 | Darnell et al. | |
| 8,034,750 B2 | 10/2011 | Thompson et al. | |
| 8,084,401 B2 | 12/2011 | Lukocs et al. | 507/238 |
| 8,093,431 B2 | 1/2012 | Falana et al. | |
| 8,097,567 B2 | 1/2012 | Wilson, Jr. | 507/131 |
| 8,141,661 B2 | 3/2012 | Kakadjian et al. | |
| 8,158,562 B2 | 4/2012 | Wilson, Jr. et al. | |
| 8,172,952 B2 | 5/2012 | Wanner et al. | |
| 8,220,546 B2 | 7/2012 | Kakadjian et al. | |
| 8,258,339 B2 | 9/2012 | Falana et al. | |
| 8,273,693 B2 | 9/2012 | Schwartz | |
| 8,287,640 B2 | 10/2012 | Zamora et al. | |
| 8,362,298 B2 | 1/2013 | Falana et al. | |
| 8,466,094 B2 | 6/2013 | Kakadjian et al. | |
| 8,475,585 B2 | 7/2013 | Zamora et al. | |
| 8,507,412 B2 | 8/2013 | Lukocs et al. | |
| 8,507,413 B2 | 8/2013 | Wilson, Jr. | |
| 8,524,639 B2 | 9/2013 | Falana et al. | |
| 8,530,394 B2 | 9/2013 | Gatlin | |
| 8,563,481 B2 | 10/2013 | Gatlin et al. | 507/203 |
| 8,714,283 B2 | 5/2014 | Gatlin et al. | |
| 8,728,989 B2 | 5/2014 | Kakadjian et al. | |
| 8,772,203 B2 | 7/2014 | Schwartz | |
| 8,835,364 B2 | 9/2014 | Thompson et al. | |
| 8,841,240 B2 | 9/2014 | Kakadjian et al. | |
| 8,846,585 B2 | 9/2014 | Falana et al. | |
| 8,851,174 B2 | 10/2014 | Zamora et al. | |
| 8,871,694 B2 | 10/2014 | Kakadjian et al. | |
| 8,899,328 B2 | 12/2014 | Zamora et al. | |
| 8,932,996 B2 | 1/2015 | Falana et al. | |
| 8,944,164 B2 | 2/2015 | Veldman et al. | |
| 8,946,130 B2 | 2/2015 | Zamora et al. | |
| 8,950,493 B2 | 2/2015 | van Petegem et al. | |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2005/0045330 A1 | 3/2005 | Nguyen et al. | 166/281 |
| 2005/0092489 A1 | 5/2005 | Welton et al. | 166/280.2 |
| 2010/0252262 A1 | 10/2010 | Ekstrand et al. | |
| 2010/0305010 A1 | 12/2010 | Falana et al. | |
| 2010/0311620 A1 | 12/2010 | Kakadjian et al. | |
| 2011/0001083 A1 | 1/2011 | Falana et al. | |
| 2011/0177982 A1 | 7/2011 | Ekstrand et al. | |
| 2011/0240131 A1 | 10/2011 | Parker | |
| 2012/0071367 A1 | 3/2012 | Falana et al. | |
| 2012/0073813 A1 | 3/2012 | Zamora et al. | |
| 2012/0097893 A1 | 4/2012 | Wanner et al. | |
| 2012/0273206 A1 | 11/2012 | Falana et al. | |
| 2012/0279727 A1 | 11/2012 | Kakadjian et al. | |
| 2012/0295820 A1 | 11/2012 | Falana et al. | |
| 2012/0302468 A1 | 11/2012 | Falana et al. | |
| 2012/0325329 A1 | 12/2012 | Schwartz | |
| 2013/0081820 A1 | 4/2013 | Falana et al. | |
| 2013/0096038 A1 | 4/2013 | Kim et al. | |
| 2013/0175477 A1 | 7/2013 | Falana et al. | |
| 2013/0270012 A1 | 10/2013 | Kakadjian et al. | |
| 2013/0274151 A1 | 10/2013 | Kakadjian et al. | |
| 2013/0312977 A1 | 11/2013 | Lembcke et al. | |
| 2013/0331301 A1 | 12/2013 | Falana et al. | |
| 2014/0087977 A1 | 3/2014 | Kim et al. | |
| 2014/0128294 A1 | 5/2014 | Gatlin et al. | |
| 2014/0128308 A1 | 5/2014 | Levey et al. | |
| 2014/0166285 A1 | 6/2014 | Santra et al. | |
| 2014/0262287 A1 | 9/2014 | Treybig et al. | |
| 2014/0262319 A1 | 9/2014 | Treybig et al. | |
| 2014/0303048 A1 | 10/2014 | Kakadjian et al. | |
| 2014/0315763 A1 | 10/2014 | Kakadjian et al. | |
| 2014/0318793 A1 | 10/2014 | van Petergem et al. | |
| 2014/0318795 A1 | 10/2014 | Thompson, Sr. et al. | |
| 2014/0323360 A1 | 10/2014 | Comarin et al. | |
| 2014/0323362 A1 | 10/2014 | Falana et al. | |
| 2015/0007989 A1 | 1/2015 | Tan et al. | |
| 2015/0011440 A1 | 1/2015 | Zamora et al. | |
| 2015/0051311 A1 | 2/2015 | Zamora et al. | |
| 2015/0068747 A1 | 3/2015 | Hwang et al. | |
| 2015/0072901 A1 | 3/2015 | Samuel et al. | |
| 2015/0087561 A1 | 3/2015 | Falana et al. | |
| 2015/0087562 A1 | 3/2015 | Falana et al. | |

FOREIGN PATENT DOCUMENTS

| | | | |
|---|---|---|---|
| DE | 4027300 | 5/1992 | B10D 53/14 |
| GB | 775376 | 10/1954 | |
| GB | 1073338 A | 6/1967 | |
| JP | 10001461 | 6/1988 | C07C 211/50 |
| JP | 08151422 | 11/1996 | |
| JP | 10110115 A | 4/1998 | |
| JP | 2005194148 A | 7/2005 | |
| WO | WO 98/56497 | 12/1998 | |
| WO | WO 2009141308 | 11/2009 | C09K 8/528 |

* cited by examiner

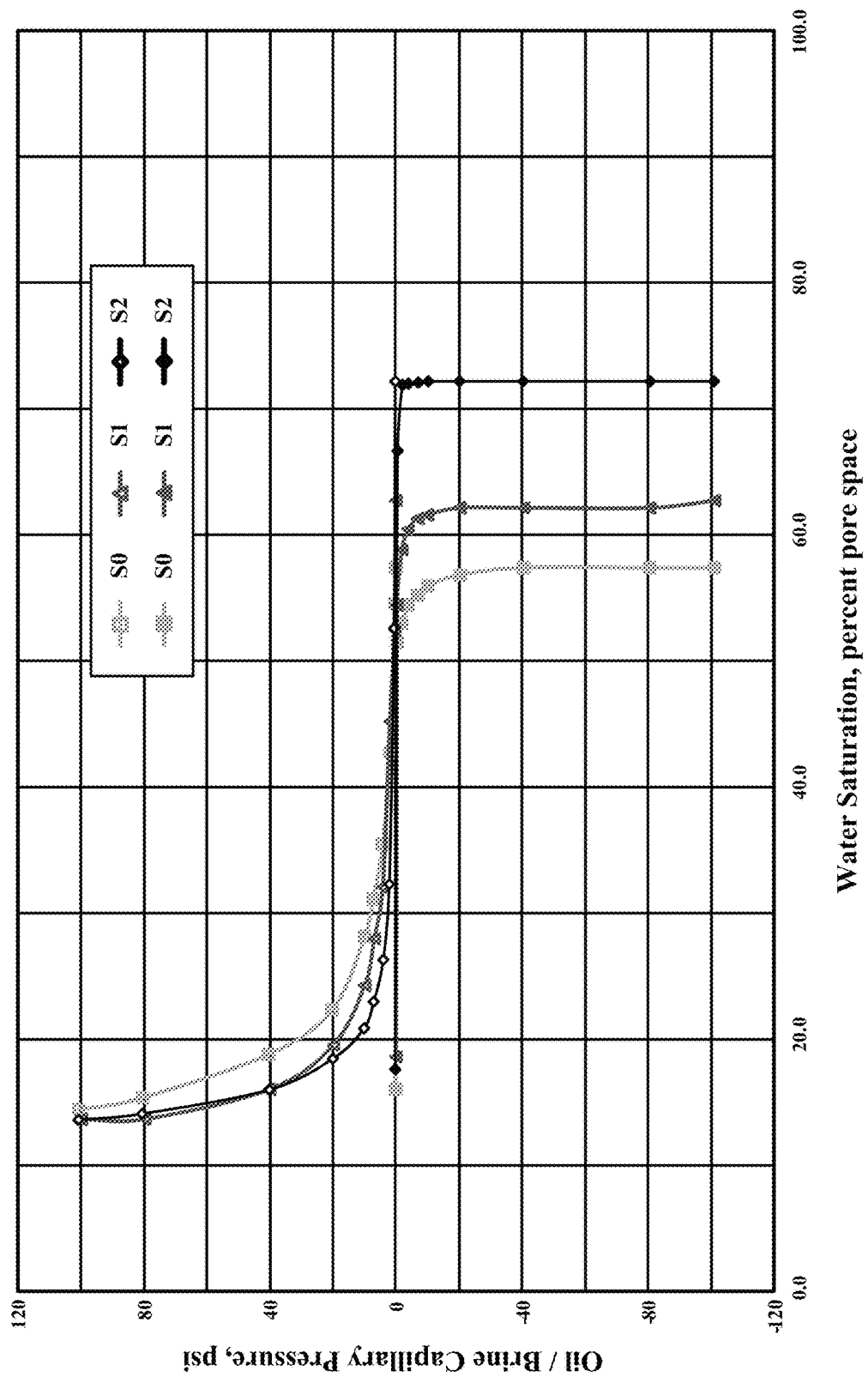

ZETA POTENTIAL MODIFIERS TO DECREASE THE RESIDUAL OIL SATURATION

RELATED APPLICATIONS

This application is a divisional application of U.S. patent application Ser. No. 12/832,222, filed 8 Jul. 2010 (Jul. 8, 2010), now U.S. Pat. No. 8,871,694 issued Oct. 28, 2014, which is continuation-in-part of U.S. patent application Ser. No. 12/151,429, filed May 6, 2008, now U.S. Pat. No. 7,956,017 issued 7 Jun. 2011 (Jun. 7, 2011), which is a divisional application of U.S. patent application Ser. No. 11/298,547, filed Dec. 9, 2005, now U.S. Pat. No. 7,392,847, issued Jul. 1, 2008 and/or of U.S. patent application Ser. No. 12/075,461, filed Mar. 11, 2008, now U.S. Pat. No. 7,829,510 issued 9 Nov. 2010 (Nov. 9, 2010), which is a divisional application Ser. No. 11/298,556, filed Dec. 9, 2005, now U.S. Pat. No. 7,350,579, issued Apr. 1, 2008. These patents and applications are incorporated by reference through the operation of the last paragraph of the specification.

BACKGROUND OF THE INVENTION

1. Field of the Invention

Embodiments of the present invention relate to coating composition for improving oil production, which is adapted to coat solid materials, particles, substrates and/or surfaces of producing formations and methods for making and using same.

More particularly, embodiments of the present invention relates to compositions for improving oil production, where the compositions include an amine component, an aminephosphate ester component and optionally a solvent component, the compositions are adapted to coat solid materials, substrates and/or surfaces of producing formations and methods for making and using same, where the coating agents modify surface properties of the solid materials, substrates and/or surfaces of producing formations to increase oil flow through producing formations, to decrease oil layers adhered to surfaces of the producing formation and to decrease a capillary pressure on the formation.

2. Description of the Related Art

Historically, the use of different chemical systems has been proposed to increase oil production. Some successful applications are injection of polymers, which can either reduce the viscosity of the production fluids (crude oil) or increase the viscosity of water. Injection of water or aqueous solutions with increased viscosity has also been used to force the crude out of the stratum.

Tensioactive systems, such as surfactants, have been injected to lower the capillary pressure that impedes oil droplets from moving through the formation or reservoir. This approach has been followed by many service companies in squeeze jobs or in enhanced oil recovery operations.

While there are known methods and compositions for increasing oil production from oil producing formations, there is still a need in the art for new methods and compositions that can be employed to increase oil production and/or decrease a resistance to oil droplets traversing the formation.

SUMMARY OF THE INVENTION

Compositions

Embodiments of the present invention provide coating compositions adapted to form a coating on surfaces of a producing reservoir or formation or the surfaces of the producing formation and particles, synthetic or natural, in the producing formation or added to the producing formation through fracturing operations. The coating is adapted to modify surface properties or the surfaces and the particles decreasing oil residual saturation through producing reservoir or formation, where the coatings include an amine component, an aminephosphate ester component and optionally a solvent component.

The present invention provides an amine component, an aminephosphate ester component and optionally a solvent component capable to precipitate in reservoir or formation substrate where the coating is deformable and where the substrate is ideally suited for modifying surface properties or the surfaces and the particles in a producing formation to decrease residual oil saturation.

Method for Treating

The present invention provides a method for modifying surface properties of surfaces or the surfaces and particles in producing formations, where the method includes the step of contacting the surfaces or surfaces and particles with a composition under conditions sufficient to form a partial or complete coatings on surfaces or surfaces and particles, where the compositions includes an amine component, an aminephosphate ester component and optionally a solvent component.

Methods for Using the Treating Methods

The present invention provides a method for producing including the step of circulating and/or pumping a fluid into a producing reservoir or formation, where the fluid includes a coating composition of this invention. The coating is adapted to modify surface properties or the surfaces and the particles decreasing oil residual saturation through producing reservoir or formation, where the coatings include an amine component, an aminephosphate ester component and optionally a solvent component.

BRIEF DESCRIPTION OF THE DRAWINGS

The invention can be better understood with reference to the following detailed description together with the appended illustrative drawings in which like elements are numbered the same:

FIG. 1 shows the results of the inhibition tests (USBM) in a plot of oil/brine capillary pressure in psi versus water saturation (percent pore space) of Berea sandstone samples.

DETAILED DESCRIPTION OF THE INVENTION

The inventors have found that a composition can be produced that, when added to a particulate metal-oxide-containing solid or other solid materials or to a suspension or dispersion including a particulate metal-oxide-containing solid or other solid materials, the particles are modified so that an aggregation propensity, aggregation potential and/or a zeta potential of the particles are altered. The inventors have also found that metal-oxide-containing solid particles or other solid particles can be prepared having modified surfaces or portions thereof, where the modified particles have improved aggregation tendencies and/or propensities and/or alter particle zeta potentials. The inventors have also found that the compositions and/or the modified metal-oxide-containing solid or other solid particles can be used in oil field applications including drilling, fracturing, producing, injecting, sand control, or any other downhold application. The inventors have also found that the modified particulate metal-oxide-containing solid particles or particles of any other solid material can be used any other application where increased particle aggregation potentials are desirable or where decreased absolute values of the zeta potential of the particles, which is a measure of aggregation propensity. The inventors have also found that a coated particulate metal-oxide-containing solid compositions can be formed, where the coating is deformable and the coated particles tend to self-aggregate and tend to cling to surfaces having similar coatings or having similar chemical and/or physical properties to that of the coating. That is to say, that the coated particles tend to prefer like compositions, which increase their self-aggregation propensity and increase their ability to adhere to surface that have similar chemical and/or physical properties. The inventors have found that the coating compositions of this invention are distinct from known compositions for modifying particle aggregation propensities and that the coated particles are ideally suited as proppants, where the particles have altered zeta potentials that change the charge on the particles causing them to attract and agglomerate. The change in zeta potential or aggregation propensity causes each particle to have an increased frictional drag keeping the proppant in the fracture. The compositions are also ideally suited for decreasing fines migrating into a fracture pack or to decrease the adverse impact of fines migration into a fractured pack.

Compositions

The invention broadly relates to a composition including an amine and a phosphate ester. The composition modifies surfaces of solid materials or portions thereof altering the chemical and/or physical properties of the surfaces. The altered properties permit the surfaces to become self attracting or to permit the surfaces to be attractive to material having similar chemical and/or physical properties. In the case of particles including metal oxide particles such as particles of silica, alumina, titania, magnesia, zirconia, other metal oxides or oxides including a mixture of these metal oxides (natural or synthetic), the composition forms a complete or partial coating on the surfaces of the particles. The coating can interact with the surface by chemical and/or physical interactions including, without limitation, chemical bonds, hydrogen bonds, electrostatic interactions, dipolar interactions, hyperpolarizability interactions, cohesion, adhesion, adherence, mechanical adhesion or any other chemical and/or physical interaction that allows a coating to form on the particles. The coated particles have a greater aggregation or agglomeration propensity than the uncoated particles. Thus, the particles before treatment may be free flowing, while after coating are not free flowing, but tend to clump, aggregate or agglomerate. In cases, where the composition is used to coat surfaces of a geological formation, a synthetic metal oxide structure and/or metal-oxide containing particles, the particles will not only tend to aggregate together, the particles also will tend to cling to the coated formation or structural surfaces.

Treated Structures and Substrates

The present invention also broadly relates to structures and substrates treated with a composition of this invention, where the structures and substrates include surfaces that are partially or completely coated with a composition of this invention. The structures or substrates can be ceramic or metallic or fibrous. The structures or substrates can be spun such as a glass wool or steel wool or can be honeycombed like catalytic converters or the like that include channels that force fluid to flow through tortured paths so that particles in the fluid are forced in contact with the substrate or structured surfaces. Such structures or substrates are ideally suited as particulate filters or sand control media.

Methods for Treating Particulate Solids

The present invention broadly relates to a method for treating metal oxide-containing surfaces including the step of contacting the metal oxide-containing surface with a composition of this invention. The composition forms a coating on the surface altering the properties of the surface so that the surface is now capable to interacting with similarly treated surfaces to form agglomerated and/or aggregated structures. The treating can be designed to coat continuous metal oxide containing surfaces and/or the surfaces of metal oxide containing particles. If both are treated, then the particles cannot only self-aggregate, but the particles can also aggregate, agglomerate and/or cling to the coated continuous surfaces. The compositions can be used in fracturing fluids, in drilling fluids, in completion fluids, in sand control applications or any other downhole application. Additionally, the coated particles can be used in fracturing fluids. Moreover, structures, screens or filters coated with the compositions of this invention can be used to attract and remove fines that have been modified with the compositions of this invention.

Method for Fracturing and/or Propping

The present invention broadly relates to methods for fracturing a formation including the step of pumping a fracturing fluid including a composition of this invention into a producing formation at a pressure sufficient to fracture the formation. The composition modifies an aggregation potential and/or zeta-potential of formation particles and formation surfaces during fracturing so that the formation particles aggregate and/or cling to the formation surfaces or each other increasing fracturing efficiency and increasing productivity of the fracture formation. The composition of this invention can also be used in a pre-pad step to modify the surfaces of the formation so that during fracturing the formation surfaces are pre-coated. The prepad step involves pumping a fluid into the formation ahead of the treatment to initiate the fracture and to expose the formation face with fluids designed to protect the formation. Beside just using the composition as part of the fracturing fluid, the fracturing fluid can also include particles that have been prior treated with the composition of this invention, where the treated particles act as proppants to prop open the formation after fracturing. If the fracturing fluid also includes the composition, then the coated particle proppant will adhere to formation surfaces to a greater degree than would uncoated particle proppant.

In an alternate embodiment of this invention, the fracturing fluid includes particles coated with a composition of this invention as proppant. In this embodiment, the particles have a greater self-aggregation propensity and will tend to aggregate in locations that may most need to be propped open. In all fracturing applications including proppants coated with or that become coated with the composition of this invention during fracturing, the coated proppants are likely to have improved formation penetration and adherence properties. These greater penetration and adherence or adhesion properties are due not only to a difference in the surface chemistry of the particles relative to the surface chemistry of un-treated particles, but also due to a deformability of the coating itself. Thus, the inventors believe that as the particles are being forced into the formation, the coating will deform to allow the particles to penetrate into a position and as the pressure is removed the particles will tend to remain in place due to the coating interaction with the surface and due to the relaxation of the deformed coating. In addition, the inventors believe that the altered aggregation propensity of the particles will increase proppant particle density in regions of the formation most susceptible to proppant penetration resulting in an enhance degree of formation propping. For additional information on fracturing fluid components that may be used with the fracturing fluids of this invention the reader is referred to U.S. Pat. Nos. 7,140,433, 7,517,447, 7,268,100, 7,392,847, 7,350,579, 7,712,535, and 7,565,933; and United States Published Applications Nos. 20070032693, 20050137114, 20090250659, 20050250666, 20080039345, 20060194700, 20070173414, 20070129257, 20080257553, 20090203553, 20070173413, 20080318812, 20080287325, 20080314124, 20080269082, 20080197085, 20080257554, 20080251252, 20090151959, 20090200033, 20090200027, 20100000795, 20100012901, 20090067931, 20080283242, 20100077938, 20100122815, and 20090275488. These applications and patents are incorporated by reference through the operation of the last paragraph of the specification.

Method for Producing

The present invention also broadly relates to a method for producing including the step of circulating and/or pumping a fluid into, where the fluid includes a composition of this invention, which increases an aggregation potential or decreases an absolute value of the zeta potential of any particulate solid including a metal oxide-containing solid in the fluid or that becomes entrained in the fluid to increase solids removal and to decrease the potential of the particles plugging the formation and/or production tubing.

New Disclosure

The inventors have found that compositions and methods using that compositions can be implemented, where the compositions modify a Zeta Potential by coating of metal oxide surfaces of a reservoir or formation to increase oil recovery in oil producing reservoir or formations. The coating is adapted to modify surface properties or the surfaces and the particles decreasing oil residual saturation through producing reservoir or formation.

The inventors have found that chemical compositions originally designed and used as aggregating agents can be applied to meal oxides surfaces, especially metal oxide surfaces in oil-bearing formations, to increase oil production during squeeze job operations of producing wells or in injection wells to increase oil production by decreasing a residual oil saturation by means of decreasing a capillary pressure on the formation. The coating compositions of this invention include an amine component, an aminephosphate ester component and optionally a solvent component, where the aminephosphate ester component is generally a reaction product of an amine or mixture of amines and a phosphate reagent or mixture of phosphate reagents. The phosphate reagents may be phosphoric acid, polyphosphoric acid, phosphate esters or any other phosphate containing compound that will react with an amine.

Basically, the difference of the present approach to the use of surfactants and polymers is that the present compositions coat metal oxide surfaces of oil producing reservoirs and formations decreasing the capillary pressure at low oil saturation permitting increased production fluids out of the producing formations increasing oil production and/or recovery from the reservoir or formation. In certain embodiments, the coating are long lasting. In other embodiments, the coatings are substantially permanent changing the wettability more towards water wetting. In other embodiments, the coatings are permanent. In certain embodiments, the compositions include alkyl pyridinium phosphate esters including an alkyl amine components, an aminephosphate ester reaction product and optionally a solvent.

The inventors have also found that the chemical systems of this invention may also include aggregating agents for controlling proppant flow back and fine movement during squeeze jobs and in enhanced oil recovery (EOR) operations, while the coating agents increase production fluid production. The product is applied as a pump in fluid to consolidate the formation sand and prevent proppant flowback. The invention is to use aminephosphate ester reaction product chemistry for a new application in sand control and EOR operations.

Suitable Agents

Suitable amines for the amine component include, without limitation, an amine of the general formula $R^1,R^2NH$ or mixtures or combinations thereof, where $R^1$ and $R^2$ are independently a hydrogen atom or a carbyl group having between about between about 1 and 40 carbon atoms and the required hydrogen atoms to satisfy the valence, where at least $R^1$ or $R^2$ is a nitrogen containing heterocycle, and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in this invention include, without limitation, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof. In certain embodiments, the amines of the amine components comprise alkyl pyridines.

Suitable amines for preparing the amine-phosphate ester reaction products include, without limitation, any amine that is capable of reacting with a suitable phosphate ester to form a composition that forms a deformable coating on a metal-oxide-containing surface. Exemplary examples of such amines include, without limitation, any amine of the general formula $R^1,R^2NH$ or mixtures or combinations thereof, where $R^1$ and $R^2$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in this invention include, without limitation, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

Suitable phosphate esters for preparing the amine-phosphate ester reaction products include, without limitation, any phosphate ester that is capable of reacting with a suitable amine to form a composition that forms a deformable coating on a metal-oxide containing surface or partially or completely coats particulate materials. Exemplary examples of such phosphate esters include, without limitation, any phosphate esters of the general formula $P(O)(OR^3)(OR^4)(OR^5)$ or mixture or combinations thereof, where $R^3$, $R^4$, and $OR^5$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of phosphate esters include, without limitation, phosphate ester of alkanols having the general formula $P(O)(OH)_x(OR^6)_y$ where $x+y=3$ and are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates or mixtures or combinations thereof. Other exemplary examples of phosphate esters include, without limitation, phosphate esters of alkanol amines having the general formula $N[R^7OP(O)(OH)_2]_3$ where $R^7$ is a carbenyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine or mixtures or combinations thereof. Other exemplary examples of phosphate esters include, without limitation, phosphate esters of hydroxylated aromatics such as phosphate esters of alkylated phenols such as Nonylphenyl phosphate ester or phenolic phosphate esters. Other exemplary examples of phosphate esters include, without limitation, phosphate esters of diols and polyols such as phosphate esters of ethylene glycol, propylene glycol, or higher glycolic structures. Other exemplary phosphate esters include any phosphate ester than can react with an amine and coated on to a substrate forms a deformable coating enhancing the aggregating potential of the substrate. Other exemplary phosphate esters are reaction products of polyphosphoric acid and amines. Other exemplary phosphate esters are reaction products of polyphosphoric acid and alkanolamines.

EXPERIMENTS OF THE INVENTION

Comparative Example 1

This example illustrates procedure used in the preparation of the Zeta Potential altering system, a flow enhancing coating compositions of this invention.

59.0% w/w A1010, Alkolidine 11 a mix of alkyl pyridine from Lonza, was added to 32.7% w/w Methanol and mixed for 15 minutes. To this mixture was added 8.00% w/w of A2290, a phosphate ester prepared from reacting 78.50% w/w polyphosphoric acid and 21.50% w/w tri-ethanolamine. The mixture was stirred for 30 minutes.

Example 1

This example illustrates procedure used in the preparation a zeta modifying composition of this invention.

23% w/w PAP-220, a mix of alkyl pyridines from Vertelus is added to a mixture of 23% w/w ethylene glycol and 23% w/w methanol and stirred for 15 minutes. To this mixture was added 23% HAP-310, a mixture of alkyl pyridines with less than 5% of lutidine (di-methyl pryridines) and stirred for 15 minutes. To this mixtures was added 8.00% w/w A2240, a phosphate ester by reacting 53.91% w/w polyphosphoric acid, 31.91% w/w tri-ethanolamine in 14.18% w/w water and stirred for 30 minutes.

Example 2

A 2% KCl brine was prepared having a 0 wt. % concentration of the coating composition of Example 1 designated S0.

Example 3

A 2% KCl brine was prepared having a 1 wt. % concentration of the coating composition of Example 1 designated S1.

Example 4

A 2% KCl brine was prepared having a 10 wt. % concentration of the coating composition of Example 1 designated S2.

Example 5

Berea sandstone samples were treated with compositions S0, S1 and S2. The sandstone sample were then tested for modification of properties. Table 1 and Table 2 tabulates the results of the testing and FIG. 1 illustrate the results of the testing.

TABLE 1

Permeability to Air, Porosity, and USMB Wettability Measurements

| Sample | Air Permeability @ 800 psi mD | Porosity @ 800 psi Fractional | W[a] |
|---|---|---|---|
| S0[b] | 90.5 | 0.180 | 0.917 |
| S1[c] | 88.8 | 0.179 | 1.049 |
| S2[d] | 88.0 | 0.179 | 1.165 |

[a]W represents the USBM (U.S. Bureau of Mines) wettability Index defined as W = log A1/A2, USBM (U.S. Bureau of Mines) method. This is a macroscopic mean wettability of a rock to given fluids. It has no validity as an absolute measurement, but is industry standard for comparing the wettability of various core plugs.
Scale:- 1 full Oil Wettability, 0 neutral wettability and 1 full water wettability
[b]S0 - 0% coating composition of Example 2,
[c]S1 - 1% coating composition of Example 2,
[d]2 - 10% coating composition of Example 2

TABLE 2

Sandstone PV Values

| Berea Sandstone Sample | PV |
|---|---|
| Untreated | 42.4% |
| Treated with S1 | 37.3% |
| Treated with S2 | 27.8% |

Referring now to FIG. 1, a plot of oil/brine capillary pressure in psi versus water saturation (percent pore space) of Berea sandstone samples treated with a solution including 0 wt % of the zeta potential modifier of Example 1, a solution including 1 wt % of the zeta potential modifier of Example 1 and a solution including 10 wt % of the zeta potential modifier of Example 1. It is clear form the data that the zeta potential modifier of Example 1 markedly changed the behavior of the Berea sandstone even at concentrations as low as 1 wt. %, with even a greater change in behavior at concentrations of 10 wt. %. This data represents a significant and permanent or substantially permanent modification of the flow characteristics of Berea sandstone to reduce residual oil saturation of the Berea sandstone.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A coating composition comprising: an amine component selected from the group consisting of an alkyl pyrrole or mixtures of alkyl pyrroles, an alkyl piperidine or mixtures of alkyl piperidines, an alkyl pyrrolidine or mixtures of alkyl pyrrolidines, an alkyl indole or mixtures of alkyl indoles, an alkyl imidazole or mixtures of alkyl imidazoles, an alkyl quinoline or mixtures of alkyl quinolines, an alkyl isoquinoline or mixtures of alkyl isoquinolines, an alkyl pyrazine or mixtures of alkyl pyrazines, an alkyl quinoxaline or mixtures of alkyl quinoxalines, an alkyl acridine or mixtures of alkyl acridines, an alkyl pyrimidine or mixtures of alkyl pyrimidines, an alkyl quinazoline or mixtures of alkyl quinazolines, and mixtures thereof, and an amine/phosphate component comprising a reaction product of an amine or mixture of amines and a phosphate compound or mixture of phosphate compounds, where the coating composition forms a complete or partial, substantially permanent or permanent, deformable coating on a formation particulate material, a solid material, a substrate and/or a surface of a producing formation and changes, alters, and/or modifies surface properties of the formation particulate material, the solid material, the substrate and/or a surface of the producing formation and/or changes, alters, and/or modifies a zeta potential and/or aggregating propensity of the formation particulate material, the solid material, the substrate and/or the surface of the producing formations decreasing residual oil saturation in the producing formation, increasing a self aggregation propensity of the formation particulate material and the solid material and increasing a degree of adherence of the formation particulate material and the solid material to the substrate and/or the surface of the producing formations, and where the coating changes a wettability of the formation surfaces towards water wetting.

2. The composition of claim 1, further comprising: a solvent component.

3. The composition of claim 2, wherein the solvent component comprises lower alcohols having between 1 and about 4 carbon atoms, glycols, acetates, other oxygen containing solvents or mixtures thereof.

4. The composition of claim 1, wherein the amines for the amine/phosphate component comprise amines capable of reacting with the phosphate compounds to form an amine/phosphate component and the phosphate compounds comprise phosphate compounds capable of reacting with the amines for the amine/phosphate component to form the amine/phosphate component.

5. The composition of claim 4, wherein: the amines for the amine/phosphate component comprise amines of the general formula $R^1R^2NH_2$ or mixtures thereof, where $R^1$ and $R^2$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur and mixtures thereof and where one or more of the hydrogen atoms can be replaced by one or more single valence atoms selected from the group consisting of fluorine, chlorine, bromine, iodine and mixtures thereof; and the phosphate compounds for the amine/phosphate component comprise: (a) phosphate esters of the general formula $P(O)(OR^3)(OR^4)(OR^5)$, phosphoric acid, polyphosphoric acid, or mixtures thereof, where $R^3$, $R^4$, and $R^5$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur and mixtures thereof and where one or more of the hydrogen atoms can be replaced by one or more single valence atoms selected from the group consisting of fluorine, chlorine, bromine, iodine and mixtures thereof, (b) phosphate esters of alkanols having the general formula $P(O)(OH)_x(OR^6)_y$ where x+y=3 and $R^6$ is independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur and mixtures thereof and where one or more of the hydrogen atoms can be replaced by one or more single valence atoms selected from the group consisting of fluorine, chlorine, bromine, iodine and mixtures thereof, (c) phosphate esters of alkanol amines having the general formula $N[R^7OP(O)(OH)_2]_3$ where $R^7$ is a carbenyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur and mixtures thereof and where one or more of the hydrogen atoms can be replaced by one or more single valence atoms selected from the group consisting of fluorine, chlorine, bromine, iodine and mixtures thereof, or (d) mixtures thereof.

6. The composition of claim 5, wherein the phosphate ester is a phosphate ester of an alkanol amine.

7. A coated surface composition comprising: a surface of a producing formation or a substrate partially or completely coated with a coating composition comprising: an amine component comprising an alkyl pyrrole or mixtures of alkyl pyrroles, an alkyl piperidine or mixtures of alkyl piperidines, an alkyl pyrrolidine or mixtures of alkyl pyrrolidines, an alkyl indole or mixtures of alkyl indoles, an alkyl imidazole or mixtures of alkyl imidazoles, an alkyl quinoline or mixtures of alkyl quinolines, an alkyl isoquinoline or mixtures of alkyl isoquinolines, an alkyl pyrazine or mixtures of alkyl pyrazines, an alkyl quinoxaline or mixtures of alkyl quinoxalines, an alkyl acridine or mixtures of alkyl acridines, an alkyl pyrimidine or mixtures of alkyl pyrimidines, an alkyl quinazoline or mixtures of alkyl quinazolines, or mixtures thereof, and an amine/phosphate component comprising a reaction product of an amine or mixture of amines and a phosphate compound or mixture of phosphate compounds, where the coating is substantially permanent or permanent and deformable and changes, alters, and/or modifies surface properties of the formation or substrate surface and/or changes, alters, and/or modifies a zeta potential and/or aggregating propensity of the formation or substrate surface decreasing residual oil saturation in the producing formation, increasing a self-aggregation propensity of the formation particulate material and the solid material and increasing a degree of adherence of the formation particulate material and the solid material to the substrate and/or the surface of the producing formations, and where the coating changes a wettability of the formation surfaces towards water wetting.

8. The composition of claim 7, further comprising: a solvent component.

9. The composition of claim 8, wherein the solvent component comprises lower alcohols having between 1 and about 4 carbon atoms, glycols, acetates, other oxygen containing solvents or mixtures thereof.

10. The composition of claim 7, wherein the amines for the amine/phosphate component comprise amines capable of reacting with the phosphate compounds to form an amine/phosphate component and the phosphate compounds comprise phosphate compounds capable of reacting with the amines to form an amine/phosphate component.

11. The composition of claim 10, wherein: the amines for the amine/phosphate component comprise amines of the general formula $R^1R^2NH_2$ or mixtures thereof, where $R^1$ and $R^2$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur and mixtures thereof and where one or more of the hydrogen atoms can be replaced by one or more single valence atoms 8 selected from the group consisting of fluorine, chlorine, bromine, iodine and mixtures thereof; and the phosphate compounds for the amine/phosphate component comprise: (a) phosphate esters of the general formula $P(O)(OR^3)(OR^4)(OR^5)$, phosphoric acid, polyphosphoric acid, or mixture or combinations thereof, where $R^3$, $R^4$, and $R^5$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur and mixtures thereof and where one or more of the hydrogen atoms can be replaced by one or more single valence atoms selected from the group consisting of fluorine, chlorine, bromine, iodine and mixtures thereof, (b) phosphate esters of alkanols having the general formula $P(O)(OH)_x(OR^6)_y$ where x+y=3 and $R^6$ is independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur and mixture or combinations thereof and where one or more of the hydrogen atoms can be replaced by one or more single valence atoms selected from the group consisting of fluorine, chlorine, bromine, iodine and mixtures thereof, (c) phosphate esters of alkanol amines having the general formula $N[R^7OP(O)(OH)_2]_3$ where $R^7$ is a carbenyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixtures thereof and where one or more of the hydrogen atoms can be replaced by one or more single valence atoms selected from the group consisting of fluorine, chlorine, bromine, iodine or mixtures thereof, or (d) mixtures thereof.

12. The composition of claim 11, wherein the phosphate ester is a phosphate ester of an alkanol amine.

13. A coated particulate composition comprising: a particulate material partially or completely coated with a coating composition comprising: an amine component comprising an alkyl pyrrole or mixtures of alkyl pyrroles, an alkyl piperidine or mixtures of alkyl piperidines, an alkyl pyrrolidine or mixtures of alkyl pyrrolidines, an alkyl indole or mixtures of alkyl indoles, an alkyl imidazole or mixtures of alkyl imidazoles, an alkyl quinoline or mixtures of alkyl quinolines, an alkyl isoquinoline or mixtures of alkyl isoquinolines, an alkyl pyrazine or mixtures of alkyl pyrazines, an alkyl quinoxaline or mixtures of alkyl quinoxalines, an alkyl acridine or mixtures of alkyl acridines, an alkyl pyrimidine or mixtures of alkyl pyrimidines, an alkyl quinazoline or mixtures of alkyl quinazolines, or mixtures thereof, and an amine/phosphate component comprising a reaction product of an amine or mixture of amines and a phosphate reagent or mixture of phosphate reagents, where coating is substantially permanent or permanent and deformable on the particulate material includes a formation particulate material or a proppant solid material and changes, alters, and/or modifies surface properties of the formation particulate material and/or the solid material, a substrate and/or a surface of a producing formation and/or changes, alters, and/or modifies a zeta potential and/or aggregating propensity of the formation particulate material, the solid material, the substrate and/or the surface of the producing formations decreasing residual oil saturation in the producing formation, increasing a self-aggregation propensity of the formation particulate material and the solid material and increasing a degree of adherence of the formation particulate material and the solid material to the substrate and/or the surface of the producing formations and where the coating changes a wettability of the formation surfaces towards water wetting.

14. The composition of claim 13, further comprising: a solvent component.

15. The composition of claim 14, wherein the solvent component comprises lower alcohols having between 1 and about 4 carbon atoms, glycols, acetates, other oxygen containing solvents or mixtures thereof.

16. The composition of claim 13, wherein the amines for the amine/phosphate component comprise amines capable of reacting with the phosphate compounds to form an amine/phosphate component and the phosphate compounds comprise phosphate compounds capable of reacting with the amines to form an amine/phosphate component.

17. The composition of claim 16, wherein: the amines for the amine/phosphate component comprise amines of the general formula $R^1R^2NH_2$ or mixtures thereof, where $R^1$ and $R^2$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur and mixtures thereof and where one or more of the hydrogen atoms can be replaced by one or more single valence atoms selected from the group consisting of fluorine, chlorine, bromine, iodine and mixtures thereof; and the phosphate compounds for the amine/phosphate component comprise: (a) phosphate esters of the general formula $P(O)(OR^3)(OR^4)(OR^5)$ phosphoric acid, polyphosphoric acid, or mixture or combinations thereof, where $R^3$, $R^4$, and $R^5$ are independently a hydrogen atom or a carbyl group having between about I and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur and mixtures thereof and where one or more of the hydrogen atoms can be replaced by one or more single valence atoms selected from the group consisting of fluorine, chlorine, bromine, iodine and mixtures thereof, (b) phosphate esters of alkanols having the general formula $P(O)(OH)_x(OR^6)_y$ where x+y=3 and $R^6$ is independently a hydrogen atom or a carbyl group having between about I and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur and mixtures thereof and where one or more of the hydrogen atoms can be replaced by one or more single valence atoms selected from the group consisting of fluorine, chlorine, bromine, iodine and mixtures thereof, (c) phosphate esters of alkanol amines having the general formula $N[R^7OP(O)(OH)_2]_3$ where $R^7$ is a carbenyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur and mixtures thereof and where one or more of the hydrogen atoms can be replaced by one or more single valence atoms selected from the group consisting of fluorine, chlorine, bromine, iodine and mixtures thereof, or (d) mixtures thereof.

18. The composition of claim 17, wherein the phosphate ester is a phosphate ester of an alkanol amine.

* * * * *